United States Patent
Katz

[11] Patent Number: 5,873,626
[45] Date of Patent: Feb. 23, 1999

[54] BICYCLE SEAT

[76] Inventor: David L. Katz, 465 Tom Swamp Rd., Mt. Carmel, Conn. 06518

[21] Appl. No.: 950,953
[22] Filed: Oct. 15, 1997
[51] Int. Cl.⁶ ....................................................... B62J 1/10
[52] U.S. Cl. .................... 297/202; 297/195.1; 297/452.4
[58] Field of Search ................................ 297/195.1, 201, 297/202, 452.4; 4/237, 905

[56] References Cited

U.S. PATENT DOCUMENTS

| | | |
|---|---|---|
| 575,509 | 1/1897 | Newell . |
| 604,068 | 5/1898 | Morgan . |
| 629,956 | 8/1899 | Craig . |
| 694,875 | 3/1902 | Meighan . |
| 872,124 | 11/1907 | Hammaren ............................. 297/201 |
| 1,510,493 | 10/1924 | Dillard ........................................ 4/237 |
| 1,623,818 | 4/1927 | Tichota . |
| 4,433,870 | 2/1984 | Bairen ..................................... 297/4 X |
| 4,877,286 | 10/1989 | Hodson et al. . |
| 5,123,698 | 6/1992 | Hodges . |
| 5,188,422 | 2/1993 | Montgomery ..................... 297/195.11 |
| 5,286,082 | 2/1994 | Hanson . |
| 5,387,025 | 2/1995 | Denisar ............................... 297/201 X |

FOREIGN PATENT DOCUMENTS

| | | | |
|---|---|---|---|
| 2491311 | 4/1982 | France ......................................... 297/4 |
| 97.323 | 5/1898 | Germany ................................ 297/202 |
| 14149 | of 1897 | United Kingdom ................ 297/195.1 |
| 23596 | of 1898 | United Kingdom ................... 297/202 |

*Primary Examiner*—Peter R. Brown
*Attorney, Agent, or Firm*—Bachman & LaPointe, P.C.

[57] ABSTRACT

In accordance with the present invention, a seat comprises a frame to be sat on by a user, which frame includes two side portions for supporting the ischial tuberosities and for substantially avoiding the application of pressure to the perineal body and the other perineal structures of the user. Each of the side portions includes a hollow loop portion for reducing the weight of the frame and for displacing the pressure onto a multiplicity of different support points. The frame further includes a portion, at the rear of the seat, connecting the side portions.

18 Claims, 4 Drawing Sheets

BICYCLE SEAT

BACKGROUND OF THE INVENTION

The present invention relates to a seat, in particular a seat for a bicycle.

Bicycles have undergone significant design developments in recent years. For example, bicycles are now made out of high strength, lightweight materials. There also have been vast improvements in wheel design from which have evolved mountain bicycles and touring bicycles as well as racing bicycles. A substantial amount of design effort has been devoted to providing a rider with a more comfortable ride. U.S. Pat. No. 604,068 to Morgan for example illustrates a bicycle seat having movable sides adapted to move up and down to adjust the seat to the movements of the rider's legs.

A number of bicycle seats have been designed to be adjustable in width in order to provide more comfortable platforms for the rider to rest his buttocks upon. U.S. Pat. Nos. 629,956 to Craig, 872,124 to Hammaren, 1,623,818 to Tichota, 4,877,286 to Hobson et al. and 5,123,698 to Hodges illustrate some of these adjustable width bicycle seat designs. In another design intended to provide rider comfort, the bicycle seat is formed by three pads, one of which is rigidly secured to a saddletree and two of which are adjustably mounted to the saddletree. U.S. Pat. No. 694,875 to Meighan illustrates this type of bicycle seat.

In order to provide a more comfortable ride, shock absorbing structures have been incorporated into the support systems for bicycles seats. U.S. Pat. No. 5,387,025 to Denisar illustrates a bicycle seat having a shock absorbing device.

Still further, attempts; have been made to provide anatomically correct seat designs. U.S. Pat. No. 575,509 to Newell illustrates a seat: designed to support a rider in a manner which relieves all middle flesh or the perineum from pressure. The seat is composed of a rim or open frame shaped at its back portion to embrace the buttocks of the rider and further provided with inwardly-extended arms at a front portion, which arms are separated to avoid contact with the middle flesh or perineum of the rider. The inwardly extending arms are inclined upward so as to offer resistance to any tendency of the rider to slip forward outward of the seat by the impingement of the anterior aspect of the ischial tuberosities and the muscles and other soft parts covering them against the arms.

U.S. Pat. No. 5,286,082 to Hanson illustrates a bicycle seat which accommodates for the movement of a rider's ischial tuberosities. In a first embodiment of the Hanson device, portions of the seat coinciding with the rider's ischial tuberosities yield to the downward movement of the ischial tuberosities to reduce the magnitude of the localized pressure concentrations in these areas. In a second embodiment of the Hanson device, the seat has a portion which pivots transversely about the central, longitudinal axis of the seat during the pedalling motion to account not only for the downward movement of an ischial tuberosity but also for the associated upward movement of the other ischial tuberosity.

Notwithstanding these designs, there remains a need for a lightweight seat which provides for rider comfort and which is designed to reduce the potential for injury.

SUMMARY OF THE INVENTION

Accordingly, it is a principal object of the present invention to provide a seat, for use on a land vehicle such as a bicycle and in other environments, which supports the ischial tuberosities while substantially avoiding the application of pressure to the perineal body and the perineal structures of a user.

It is a further object of the present invention to provide a seat as above which is aerodynamic and formed from lightweight materials.

It is another object of the present invention to provide a seat as above which reduces the potential for injury.

It is yet a further object of the present invention to provide a seat as above which is aesthetically pleasing, easy to manufacture, and relatively inexpensive to produce.

The foregoing objects are attained by the seat of the present invention.

In accordance with the present invention, a seat comprises a frame to be sat on by a user, which frame includes two side portions for supporting the ischial tuberosities and for substantially avoiding the application of pressure to the perineal body and the other perineal structures of the user. Each of the side portions includes a hollow loop portion for reducing the weight of the frame and for displacing any pressure onto a multiplicity of different support points. The frame further includes a portion, at the rear of the seat, connecting the side portions.

In a preferred embodiment of the present invention, the frame is formed from one or more lightweight, hollow tubular members. The tubular members may be formed from materials such as metallic alloys, i.e. aluminum alloys or titanium alloys, or high strength plastic materials.

A seat in accordance with the present invention may also include means for adjusting the width of the seat to accommodate different sized users and to distribute the weight of the user in desired locations. Still further, the seat may include means for adjusting the height of the seat relative to a support structure.

Other features of the present invention, as well as other objects and advantages attendant thereto, are set forth in the following description and the accompanying drawings in which like reference numerals depict like elements. While the present invention will be discussed in the context of a seat for a bicycle, it should be recognized that the seat could be used in other environments. For example, the seat could be used with a motorcycle or a farm vehicle. Still further, the seat may be used on exercise equipment or as part of a chair.

DETAILED DESCRIPTION OF THE PREFERRED EMBODIMENT(S)

Figure 1:
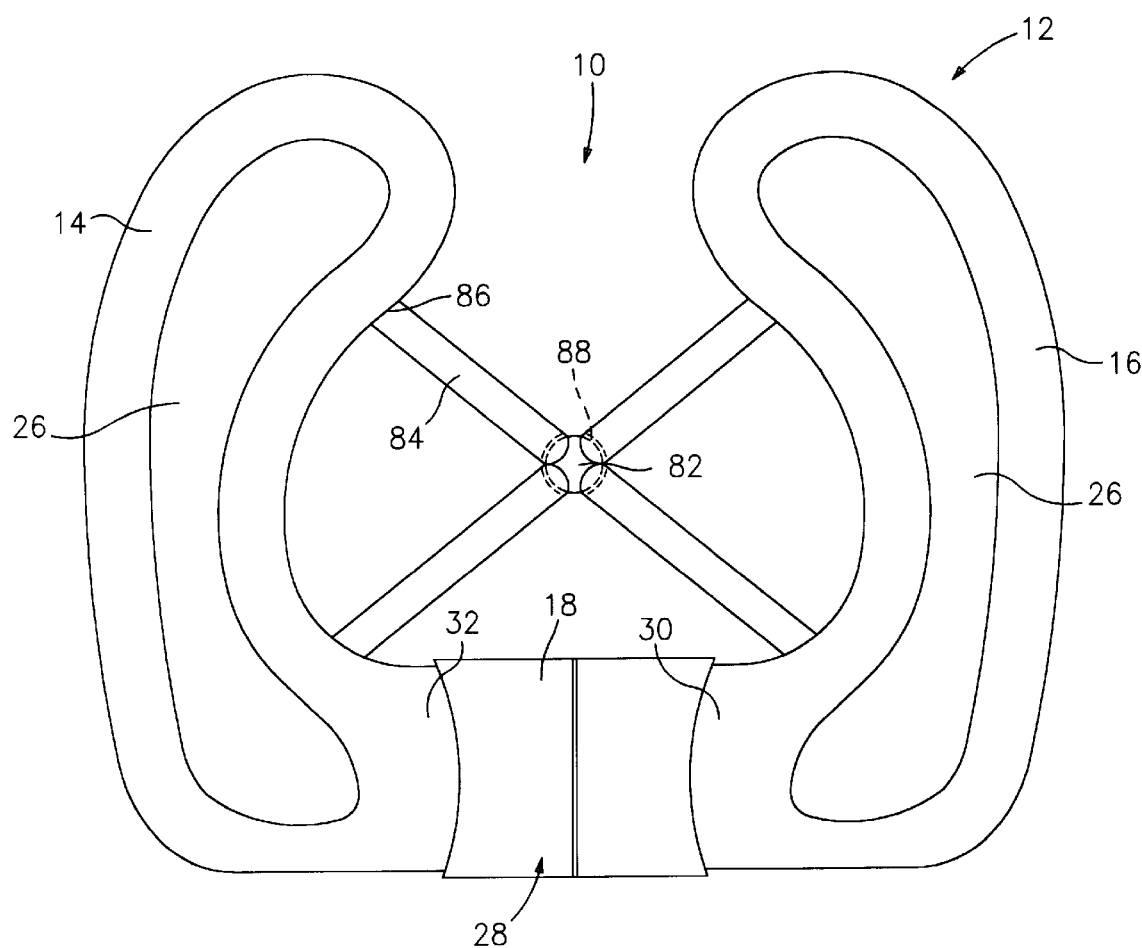
FIG. 1 is a top view of a seat in accordance with the present invention.
Figure 2:
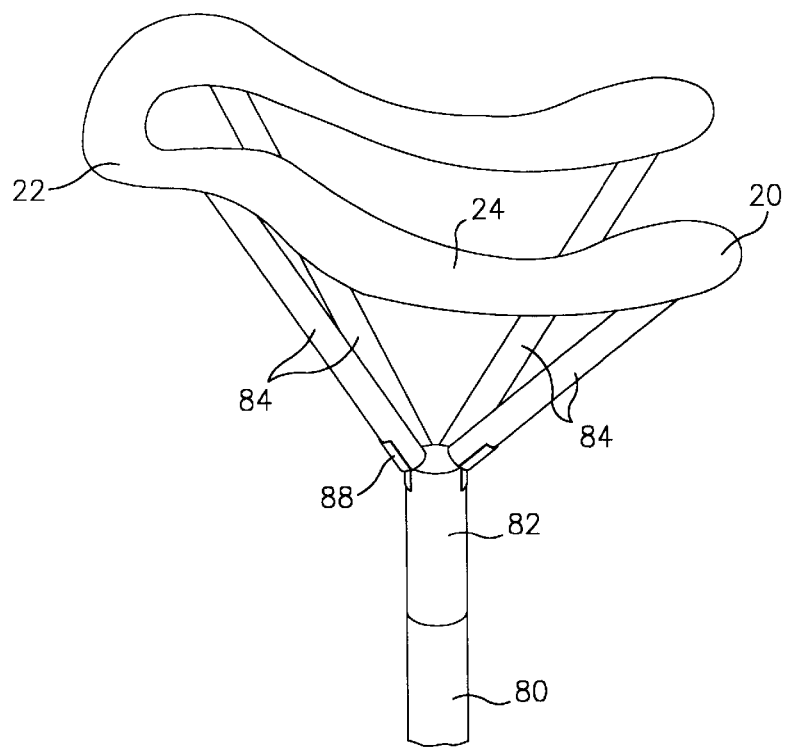
FIG. 2 is a side view of the seat of FIG. 1.

As previously discussed, the present invention relates to a seat, which has a wide number of applications but particular utility on land vehicles such as bicycles. Referring to FIGS. 1 and 2, the seat 10 has a frame 12 with two side portions 14 and 16 spaced apart by a distance which allows the side portions to support the ischial tuberosities of a user without the application of any substantial pressure to the perineal body or other perineal structures of the user. Each side portion 14, 16 has a front portion 20, a rear portion 22, and an intermediate portion 24 which curves laterally upward from the front portion 20 to the rear portion 22 in a manner which conforms to the shape of the gluteus. A hollow loop portion 26 is included in each side portion to reduce the weight of the frame without sacrificing the desired support for the ischial tuberosities. In fact, the hollow loop portions 26 help to better distribute the pressure acting on the user. Instead of their being just two lateral support points, the loop portions 26 create four lateral support points.

The side portions 14 and 16 may be formed from any suitable structure known in the art. For example, each side portion 14 and 16 may be formed from one or more hollow tubular members bent or stamped to obtain the desired curvatures. The tubular members may be formed from lightweight, high strength materials such as aluminum alloys, titanium alloys, and/or plastic materials including Kevlar fibers and the like. If desired, the tubular members may have a triangular cross-section with one of the sides of the triangle forming the top surfaces for the side portions 14 and 16. Alternatively, the side portions 14 and 16 may be stamped metal structures or molded plastic structures.

Figure 3:
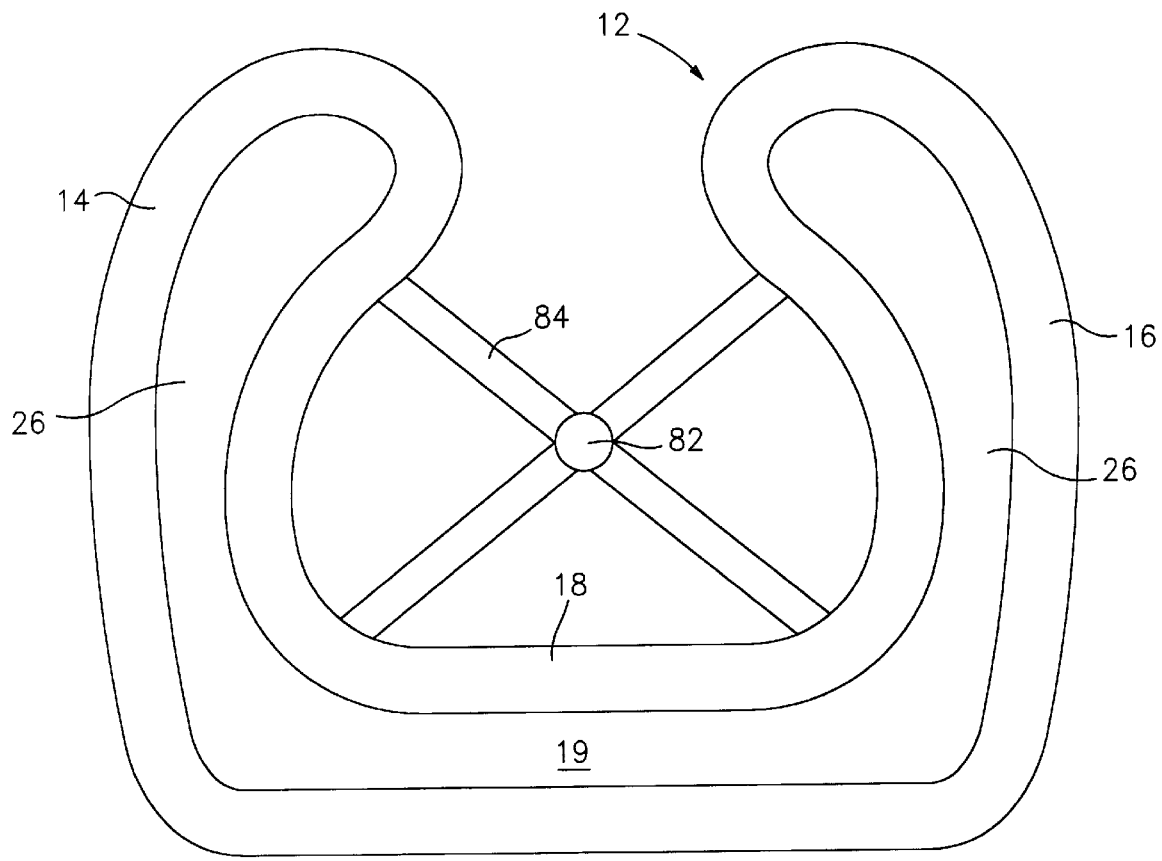
FIG. 3 is a top view of an alternative seat embodiment in accordance with the present invention.

The frame 12 further comprises a connecting portion 18 for joining the two side portions 14 and 16. If it is desired to have a constant width seat, then the connecting portion 18 may be formed integrally with the side portions 14 and 16. As shown in FIG. 3, the connecting portion 18 may have an open space 19 which mates with the open ended loops 26 in the side portions 14 and 16.

Figure 4:
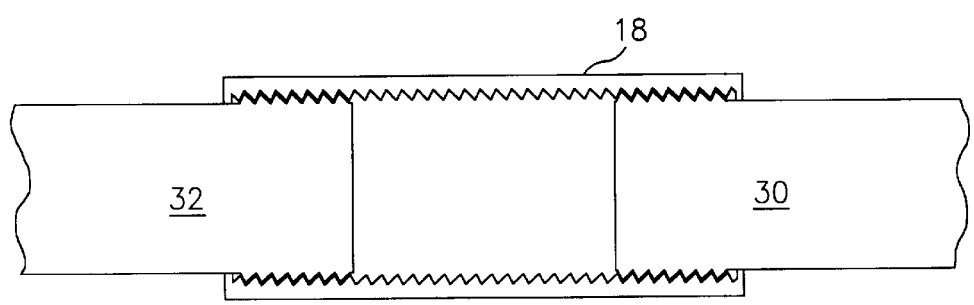
FIG. 4 is a sectional view of mechanism for adjusting the width of the seat.

Preferred embodiments of the seat of the present invention however include a mechanism 28 for adjusting the width of the seat so that the seat better fits the user and so that the weight of the user is better distributed. In such embodiments, the connecting portion 18 is preferably formed by a hollow cylindrical member which overlaps end portions 30 and 32. To allow for adjustment of the width of the seat, each of the end portions 30 and 32 may be threaded along an exterior surface as shown in FIG. 4. The hollow cylindrical member forming the connecting portion 18 may also be threaded along interior surfaces so as to permit the cylindrical member to be rotated and thereby allow the end portions 30 and 32 to be brought closer together or farther apart. If desired, the hollow cylindrical member could be formed by two independently rotatable cylinders having threaded interior surfaces.

Figure 5:
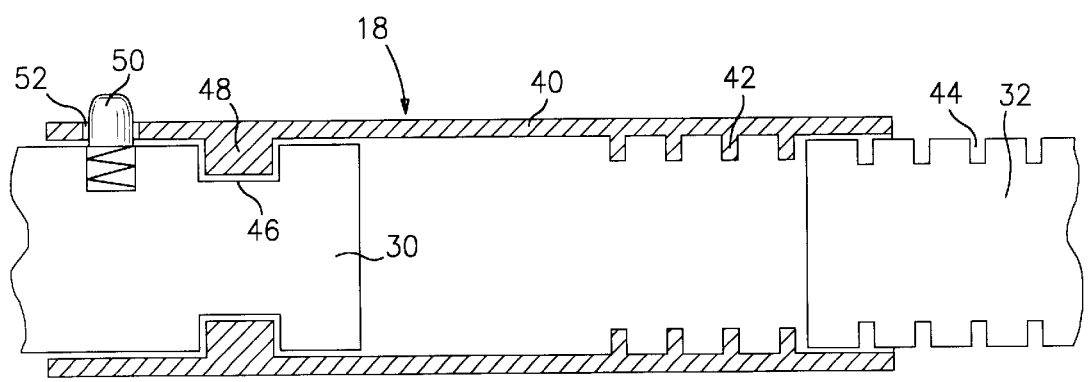
FIG. 5 is a sectional view of an alternative mechanism for adjusting the width of the seat.

Another form of seat width adjusting mechanism 28 is illustrated in FIG. 5. In this alternative, the connecting portion 18 is formed by a cylindrical shaped member 40 having a plurality of teeth 42 along its interior surfaces. The teeth preferably cover an arc of 45°. One of the end portions 32 is provided with a series of grooves 44 along two opposed surfaces. The grooves 44 are shaped to engage with the teeth 42 to secure the end portion 32 in a fixed position relative to the member 40. The other end portion 30 fits within the cylindrical member 40 and has a groove 46 which extends around its periphery. The groove 46 mates with a pair of opposed tongues 48. The engagement of the tongues 48 with the groove 46 secures the cylindrical member 40 in a fixed position relative to the end portion 30. The tongue and groove arrangement also allows the cylindrical member 40 to be rotated and thereby move the teeth 42 out of engagement with the grooves 44. If desired, a locking mechanism may be provided to prevent rotation of the cylindrical member 40 when the seat is being used. Any suitable locking mechanism could be utilized. For example, the end portion 30 could carry a spring-loaded knob or button 50 which engages a slot 52 in the cylindrical member 40. To release the locking mechanism and allow rotation of the cylindrical member 40, the knob or button 50 need only be depressed until it no longer engages the slot 52.

Figure 6:
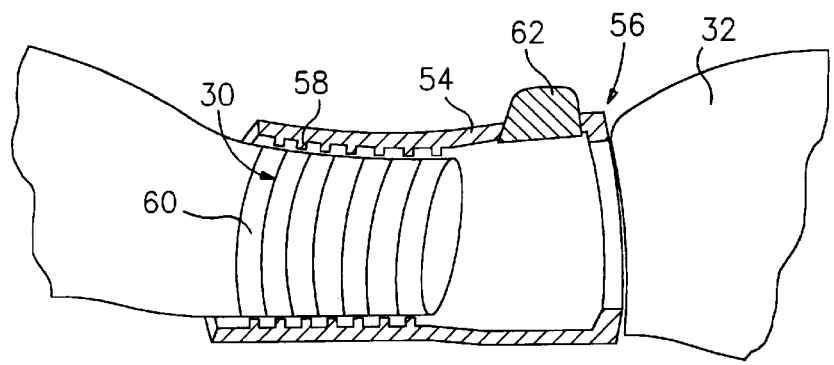
FIG. 6 is a sectional view of an alternative mechanism for adjusting the width of the seat.

Yet another embodiment of a seat width adjusting mechanism is shown in FIG. 6. In this embodiment, a cylindrical connecting member 54 is secured to the end portion 32 via a tongue and groove arrangement 56. The cylindrical connecting member 54 has a set of interior threads 58 which engage a series of exterior threads 60 on the end portion 30. To adjust the width of the seat, the connecting member 54 need only be rotated to bring the end portion 30 closer to or farther away from the end portion 32. If desired, a knob or handle 62 may be provided to help rotate the connecting member 54.

Figure 7:
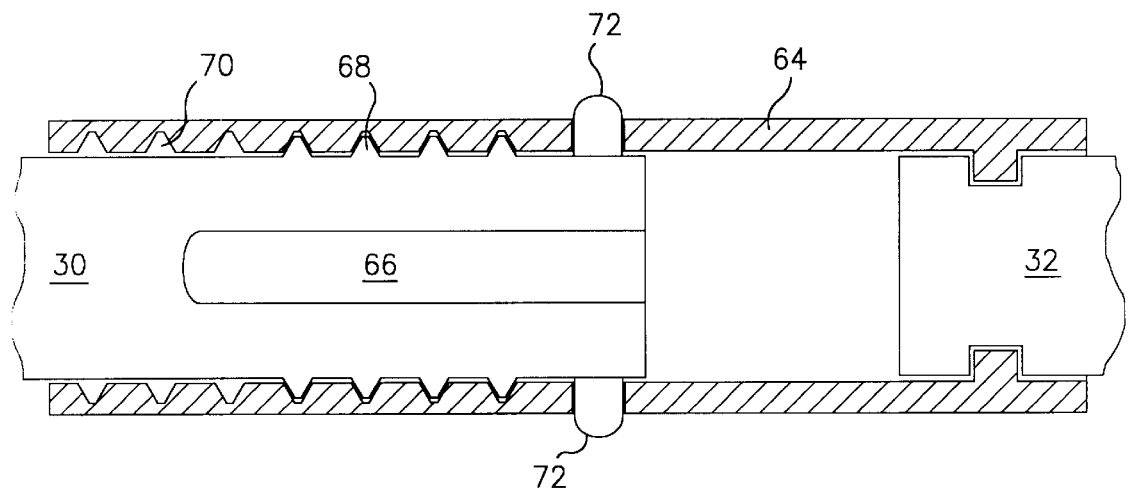
FIG. 7 is a sectional view of an alternative mechanism for adjusting the width of the seat.

Still another type of seat width adjustment mechanism is shown in FIG. 7. The mechanism 38, as before, comprises a cylindrical connecting member 64 which is connected to the end portion 32 via a tongue and groove arrangement which allows the member 64 to rotate. The end portion 30 however has two longitudinally extending grooves 66 along two opposed surfaces and a series of ratchet teeth 68 located between the grooves 66. The ratchet teeth engage a series of grooves 70 on the interior surface of the member 64. Preferably, each set of grooves 70 span about 45° of the interior circumference of the connecting member 64. Suitable means known in the art may be provided to move the teeth 68 out of engagement with the grooves 70. For example, a button-like device 72 may be provided to depress the sidewalls of the end portion 30 and move the sections between the grooves 66 inwardly and thus take the teeth 68 out of engagement with the grooves 70. Once the teeth 68 are moved out of engagement with the grooves 70, the connecting member 64 may be rotated to allow adjustment of the width of the seat. Once the desired adjustment has been made, the connecting member 64 can be rotated back and the teeth 68 allowed to re-engage the grooves 70.

Figures 10, 11, 12:
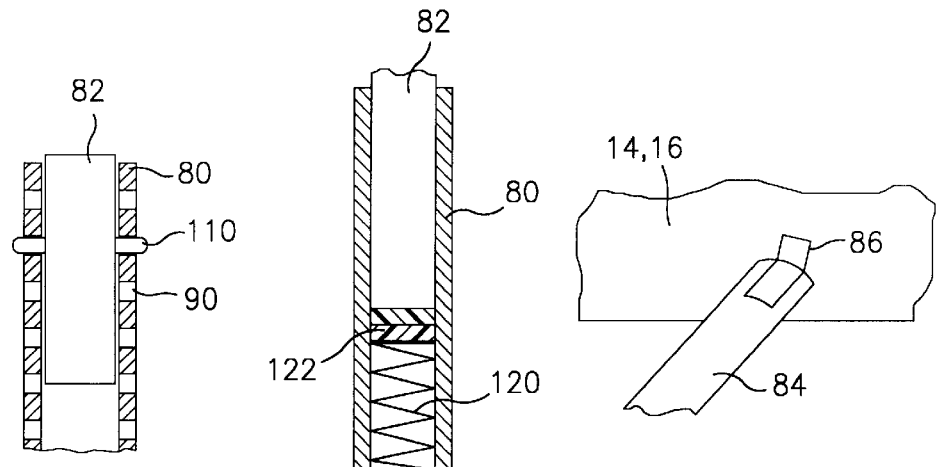
FIG. 10 is a sectional view of an alternative mechanism for adjusting the height of the seat.
FIG. 11 is a sectional view of a shock absorbing system for the seat.
FIG. 12 is a bottom view of a portion of the seat frame illustrating the hinge connection between a supporting rod and the bottom of a portion of the seat frame.

Referring now to FIG. 1, in order to be mounted to a seat support 80, the frame 12 is joined to a column-like member 82. The column-like member 82 may be designed to fit within the seat support 80 or over the seat support 80. The side portions 14 and 16 of the frame 12 are joined to column-like member 82 via four rods 84. The rods are preferably formed from aluminum or some other high strength, lightweight material. Since the seat width is to be adjusted, as shown in FIG. 12, it is desirable for each of the rods to be connected to one of the side portions 14 and 16 via a hinge mechanism 86. It is also desirable for each of the rods 84 to be connected to the column-like member 82 via a suitable hinge connection 88.

Figure 8:
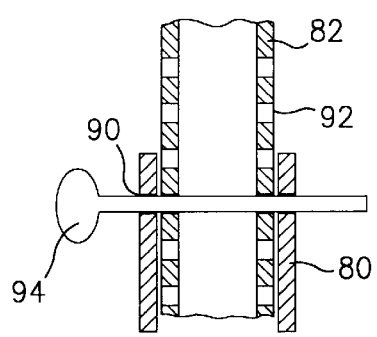
FIG. 8 is a sectional view of a mechanism for adjusting the height of the seat.

In many applications, it is desirable to have the seat 10 configured so that its height relative to the support 80 may be adjusted. To this end, the support 80 and the column-like member 82 may be provided with suitable means for allowing such height adjustment. For example, as shown in FIG. 8, the support 80 may have a pair of openings 90 and the column-like member 82 may have a plurality of openings 92 which can be aligned with the openings 90. A removable pin 94 may extend through the aligned openings 90 and 92 to secure the support 80 and the column-like member 82 in a desired position relative to each other. To adjust the height of the seat, one needs only remove the pin 94, move the column-like member 82 relative the support 80, realign the openings 90 and 92, and reinsert the pin 94. If desired, one could reduce the weight of the column-like member 82 by removing portions of the member not having the openings 92 while leaving a top cylindrical portion and a bottom cylindrical portion.

Figure 9:
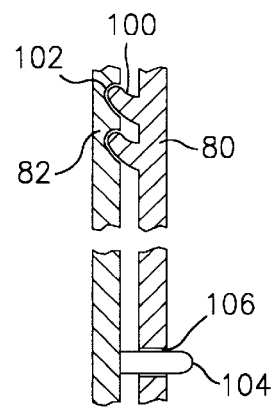
FIG. 9 is a sectional view of an alternative mechanism for adjusting the height of the seat.

Instead of using holes 90 and 92 and a pin 94, as shown in FIG. 9, one could provide the interior surface of the support 80 with a series of internal ridges 100 and the exterior surface of the column-like member 82 with a series of slots 102 shaped to receive the ridges 100. The ridges 100 and the slots 102 only extend about 45° around the inner periphery of the support 80 and the outer surface of the member 82, respectively. In addition to helping position the column-like member 82 relative to the support 80, the internal ridges 100 help support the weight of the user. A spring loaded button 104 engages a slot 106 to keep member 82 aligned with support 80. The spring loaded button 104 may be used to move the slots 102 out of contact with ridges 100 so as to allow relative movement between member 82 and support 80 by rotating the member 82 relative to the support 80.

As shown in FIG. 10, in yet another alternative embodiment of a height adjusting mechanism, the support 80 may be provided with a plurality of openings 90 and the column-like member 82 could be provided with one or more spring loaded buttons 110 for engaging one or more of the openings 90 in the support 80. When depressed, each button 110 would move out of engagement with an opening 90 and thus allow the column-like member 82 to be rotated and moved up and down relative to the support 80. When the seat was at the proper height level, the column-like member 82 may be rotated so that each button .110 re-engages one of the openings 90.

If desired, a shock absorbing system 120 can be incorporated into the support 80. Referring now to FIG. 11, the shock absorbing system 120 may comprise a spring or a conventional fluid filled shock absorber. In use, the bottom of column-like member 82 will contact an end of the l5 spring or shock absorber. If desired, one or more pads 122 may be adhered to the bottom of column-like member 82 to provide additional shock absorption.

In order to make the seat 10 more comfortable for a user, the frame 12, including the side portions 14 and 16 and the connecting portion 18, may be covered with a foam material.

The seat of the present invention has particular utility as a bicycle seat. It provides support for a rider's ischial tuberosities and gluteals without applying any substantial pressure to the perineal body and the other perineal structures. By providing both width adjustments and height adjustments, the seat may be used by a variety of different riders or under a variety of different riding conditions.

While the seat has particular utility as a bicycle seat, it could be used on other land vehicles. For example, the seat of the present invention may be used on a farm vehicle, such as a tractor, a motorcycle, and/or a moped. Still further, the seat of the present invention may be used as part of a chair or a stool or as part of an exercise apparatus.

It is apparent that there has been provided in accordance with the present invention a seat which fully satisfies the means, objects, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A seat comprising:

a generally C-shaped frame to be sat upon by a user;

said frame having colinear rear members, first and second curved exterior side members integrally formed with said rear members, curved front members integrally formed with respective ones of said exterior side members, and a connecting member integrally formed with said front members;

said connecting member comprising two interior side members joined by an intermediate member;

said frame defining two side portions for supporting the ischial tuberosities of said user and for substantially avoiding the application of pressure to the perineal body and the perineal structures of the user;

each of said side portions being defined by a portion of one of said rear members, one of said exterior side members, one of said curved front members and a portion of said connecting member;

each of said side portions including a hollow space for reducing the weight of the frame and for better distribution of the weight of the user, each said hollow space between one of said exterior side members and one of said interior side members; and said frame including means for adjusting the width of the seat.

2. The seat of claim 1 further comprising:

said colinear rear members, said first and second exterior side members, said curved front members and said connecting member each being formed by at least one tubular member.

3. A The seat of claim 2 wherein each said tubular member is hollow and is formed from a lightweight material selected from the group consisting of metallic materials and plastic materials.

4. The seat of claim 1 further comprising:

each of said side portions having a front portion;

each said front portion being beneath the level of said said colinear rear members; and each said side portion being shaped to curve upwardly from said front portion to a rear portion adjacent a respective one of said colinear rear members.

5. The seat of claim 1 wherein the position adjusting means comprises:

each of said rear members having a threaded end portion;

a hollow tubular member for receiving said end portions; and said hollow tubular member having a threaded internal surface for engaging said threaded end portions.

6. The seat of claim 1 wherein the position adjusting means comprises:

a hollow tubular member having a plurality of teeth along an interior surface;

said side portions each having an end portion;

means for securing said tubular member to a first one of said end portions so that said tubular member may rotate relative to said first one of said end portions; and means for adjustingly engaging a second one of said end portions.

7. The seat of claim 6 further comprising:

said second one of said end portions having a plurality of teeth along two opposed surfaces and a longitudinally extending groove along two opposed side walls; and means for moving said teeth out of engagement with said engaging means.

8. The seat of claim 1 further comprising:

a column-like member attached to said frame; and a support for engaging said column-like member.

9. The seat of claim 8 further comprising:

means for adjusting said column-like member relative to said support so as to raise or lower said seat.

10. The seat of claim 9 wherein said column-like member adjusting means comprises:

a plurality of holes in said column-like member;

a pair of holes in said support; and pin means for engaging said pair of holes in said support and two of said holes in said column-like member.

11. The seat of claim 9 wherein said column-like member adjusting means comprises:

a plurality of ridges on an internal surface of said support; and a plurality of slots on said column-like member for engaging said ridges.

12. The seat of claim 9 wherein said column-like member adjusting means comprises:

a plurality of aligned holes on said support; and means on said column-like member for engaging one of said holes.

13. The seat of claim 9 further comprising:

means for absorbing shocks positioned between said column-like member and said support.

14. A seat comprising:

a frame to be sat on by a user;

said frame including two side portions for supporting the ischial tuberosities of said user and for substantially avoiding the application of pressure to the perineal body and the perineal structures of the user;

each of said side portions including a hollow space for reducing the weight of the frame and for better distributing the weight of the user;

said side portions being laterally spaced apart so as to substantially avoid the application of said pressure to the perineal body and the perineal structures of the user;

a rear member connecting said side portions;

said rear member including means for adjusting the position of the side portions relative to each other and thereby adjusting the width of the seat; and the position adjusting means comprising said rear member being formed by a hollow tubular member, each of said side portions having an end portion which fits within said hollow tubular member, a first one of said end portions having a plurality of grooves along two opposed surfaces, and said hollow tubular member having a plurality of teeth for engaging said grooves.

15. The seat of claim 14 further comprising:

said hollow tubular member being rotatable relative to said first end portion so as to move said teeth out of engagement with said grooves and into engagement with said grooves.

16. The seat of claim 5 further comprising:

tongue and groove means for securing said hollow tubular member relative to a second one of said end portions and for allowing said hollow tubular member to rotate between said teeth engaging and non-engaging positions.

17. The seat of claim 16 further comprising:

means cooperating with said hollow tubular member for locking said hollow tubular member in said teeth engaging position.

18. A seat comprising:

a frame to be sat on by a user;

said frame including two side portions for supporting the ischial tuberosities of said user and for substantially avoiding the application of pressure to the perineal body and the perineal structures of the user;

each of said side portions including a hollow space for reducing the weight of the frame and for better distributing the weight of the user;

said side portions being laterally spaced apart so as to substantially avoid the application of said pressure to the perineal body and the perineal structures of the user;

a rear member connecting said side portions;

a column-like member attached to said frame;

a support for engaging said column-like member;

a plurality of radially spaced arms extending from said column-like member to said side portions of said frame; and each of said arms being hingedly connected to said column-like member and to one of said side portions.

* * * * *